(12) United States Patent
Cheung et al.

(10) Patent No.: US 7,738,884 B2
(45) Date of Patent: Jun. 15, 2010

(54) POSITIONING SERVICE UTILIZING EXISTING RADIO BASE STATIONS

(75) Inventors: Matthew Man Chung Cheung, Bellevue, WA (US); John C. Krumm, Redmond, WA (US); Chandrasekhar Thota, Redmond, WA (US); Steve J. Lombardi, Seattle, WA (US); Anurag Sharma, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 732 days.

(21) Appl. No.: 11/168,983

(22) Filed: Jun. 28, 2005

(65) Prior Publication Data

US 2010/0120422 A1 May 13, 2010

(51) Int. Cl.
*H04W 24/00* (2009.01)
(52) U.S. Cl. .............. 455/456.3; 455/404.2; 455/456.1; 455/456.2
(58) Field of Classification Search ............... 455/404.1, 455/404.2
See application file for complete search history.

(56) References Cited

U.S. PATENT DOCUMENTS

| | | | |
|---|---|---|---|
| 6,288,676 B1 | 9/2001 | Maloney | |
| 6,664,925 B1 * | 12/2003 | Moore et al. ................ | 342/451 |
| 6,799,047 B1 | 9/2004 | Bahl et al. | |
| 2001/0034223 A1 | 10/2001 | Rieser et al. | |
| 2002/0118655 A1 * | 8/2002 | Harrington et al. .......... | 370/328 |
| 2003/0093187 A1 | 5/2003 | Walker | |
| 2003/0237000 A1 * | 12/2003 | Denton et al. ............... | 713/201 |
| 2004/0160909 A1 * | 8/2004 | Sheynblat ................... | 370/328 |
| 2004/0193707 A1 | 9/2004 | Alam et al. | |
| 2004/0203918 A1 * | 10/2004 | Moriguchi et al. ....... | 455/456.1 |
| 2004/0263388 A1 | 12/2004 | Krumm et al. | |
| 2005/0020277 A1 | 1/2005 | Krumm et al. | |
| 2005/0054350 A1 * | 3/2005 | Zegelin ................... | 455/456.1 |
| 2005/0128074 A1 | 6/2005 | Culpepper et al. | |
| 2005/0204014 A1 | 9/2005 | Yao et al. | |
| 2005/0246334 A1 * | 11/2005 | Tao et al. ........................ | 707/5 |
| 2006/0109112 A1 * | 5/2006 | Haines .................. | 340/539.32 |
| 2007/0004427 A1 * | 1/2007 | Morgan et al. ........... | 455/456.1 |
| 2007/0105566 A1 * | 5/2007 | Sharony et al. .......... | 455/456.1 |

OTHER PUBLICATIONS

LaMarca, A., et al., "Place Lab: Device Positioning Using Radio Beacons in the Wild," Intel Corporation, 2004.*
International Search Report dated Jul. 27, 2007 for PCT Application Serial No. PCT/US 06/18625, 3 Pages.

* cited by examiner

*Primary Examiner*—Vincent P Harper
*Assistant Examiner*—Mazda Sabouri
(74) *Attorney, Agent, or Firm*—Woodcock Washburn LLP

(57) ABSTRACT

Location position information of a mobile device utilizing Wi-Fi, FM, AM, television transmissions(s), other radio transmission(s), electromagnetic, acoustic, or other signals received from base stations or access points. The position information can be provided through a Web service and/or locally on a mobile user device. The position information can be provided with a certainty and/or uncertainty probability percentage or other perceivable means for the user to determine the expected accuracy of the location information. Also provided is a means for updating base station information to include newly detected base stations through information from a plurality of user devices, wherein each user device is given a reliance factor. User devices that have a low reliance factor are disregarded and/or scrutinized to determine accuracy prior to such information being utilized to update information. Functioning of the system can be improved through analysis of usage data and/or the additions to the database.

13 Claims, 12 Drawing Sheets

POSITIONING SERVICE UTILIZING EXISTING RADIO BASE STATIONS

BACKGROUND

Purpose built radio positioning systems, such as the VHF omni-directional range (VOR), which is a ground-based electronic aid for aerial navigation, are commonly utilized. However, such implementations are not suited for general public use due to the restricted range associated with such systems and the system costs.

Global positioning system (GPS) is another commonly utilized purpose built navigation system and addresses the problem of measuring (latitude, longitude, elevation) accurately. This is useful for many applications, including mapping a current location, determining a starting point for routing instructions, finding nearby businesses and attractions, and other location-based services. However, GPS usually does not work indoors, and sometimes fails in urban canyons and under dense foliage. GPS receivers are single purpose devices and are not standard equipment on computational device. As a result, most people do not carry GPS receivers with them.

Cell phone radio towers are utilized for positioning. However, availability is poor due to carrier-supported positioning suffering from carrier incompatibility and tight control. Furthermore, the positioning accuracy is too low for certain location-based services. Therefore, systems and/or methods are needed that do not suffer from the aforementioned limitations and disadvantages.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

An alternative to GPS and cell towers is to utilize the known positions of existing radio base stations that can be detected from a user's computational device. One example is Wi-Fi (802.11) radio networking. By detecting one or more Wi-Fi base stations ("access points"), a device can compute its own latitude, longitude, and/or elevation based on knowledge of the base stations' positions. The accuracy achieved is superior to cell tower location systems and approaches that of GPS. Other radio base stations (e.g., cell phone towers, AM and FM radio stations, TV stations, . . . ) can be utilized in a similar manner.

Utilizing existing radio base stations means a user can compute such user's own location without a GPS receiver. Often a user can utilize an existing radio receiver that is already part of the user's computational device (e.g., laptop, PDA, cell phone, wristwatch, . . . ) thus reducing cost while increasing availability. Furthermore, since base stations are usually detectable in situations where GPS fails, this technique works where GPS does not.

Position information concerning an electronic endpoint (e.g., radio equipped device) and delivery of location information to applications can be provided through a web service, eliminating the need for the user to perform heavy computation or be burdened with a database. Alternatively or in addition, it can be provided locally for offline applications.

Embodiments describe a method and/or system for determining position location of a mobile user device. In accordance with one feature, a system for communicating position information is included on the user device as a local process. The system, in addition or alternatively, can utilize a web service that determines position information. A database of known base station locations can be utilized to determine user device position.

The application can utilize a local API or access a web service to obtain location information directly. Alternatively or in addition, the location information can be abstracted into a virtual GPS like device and utilized by a local application that does not have explicit knowledge of the positioning technology utilized. Thus, a communication port can be emulated and an NMEA compliant stream produced that describes the location information.

The system(s) and/or method(s) can be utilized locally on a user device. The various embodiments require a database of locations of detectable radio base stations. The database can be obtained in a variety of ways. The user can specify a region and a subset of known base stations can be provided to the user device. Alternatively or in addition, a Web server can compute the user's location and deliver a subset of known base stations for that region. According to another embodiment, the user device can periodically query a Web service for position updates and receive such updates on an as needed basis. According to still another embodiment, a prediction module can predict a user's future location based on previous user behavior.

Still another embodiment is a system and/or method for computing the uncertainty of the position estimate and communicating such uncertainty information to the user. The uncertainty can be based on a sum of probability functions and/or based on experimental data. Both 2D and 3D uncertainty can be determined, depending on the available information.

According to another embodiment, base station and associated locations can be contained in a database and updated based on information received from one or more devices as these devices make use of the location service. Base station information can be included after, for example, a certain confidence level of the accuracy of such information is met or exceeded. Alternatively or in addition, a user can be rated according to the accuracy and/or confidence of such user. A user that is determined to be untrustworthy can be tagged and no longer able to submit information and/or such submissions are quarantined until verified by one or more other users.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents. Other advantages and novel features will become apparent from the following detailed description when considered in conjunction with the drawings.

DETAILED DESCRIPTION

Figure 1:
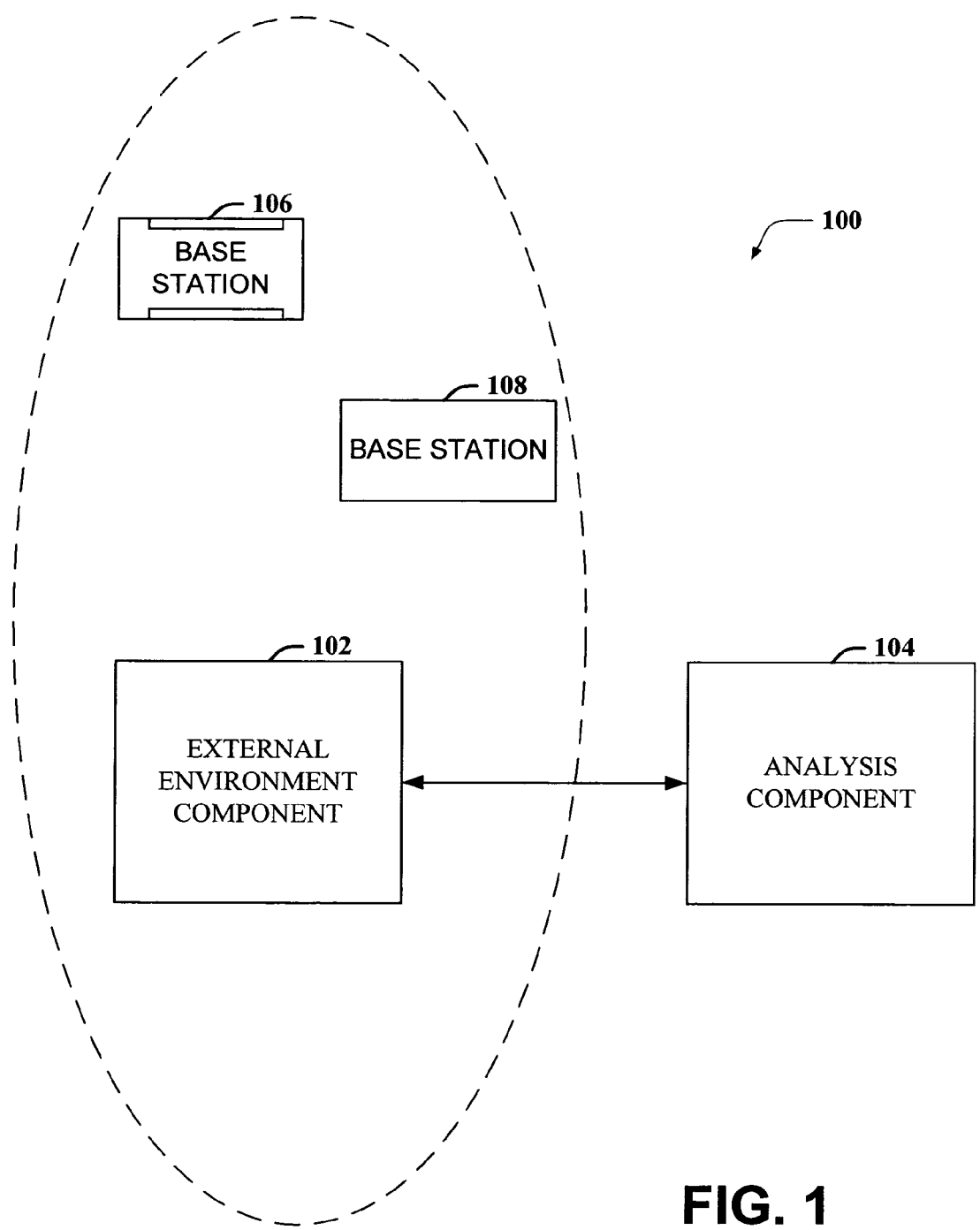
FIG. 1 illustrates is a system that enables a mobile computation device to determine its location.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component," "module," "object" "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed embodiments.

Artificial intelligence based systems (e.g., explicitly and/or implicitly trained classifiers) can be employed in connection with performing inference and/or probabilistic determinations and/or statistical-based determinations as in accordance with one or more aspects as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

Referring initially to FIG. 1, illustrated is a system 100 that enables a mobile computation device to determine its location. The mobile computation device can be any mobile, portable or computation device. The system 100 includes an external environment component 102 and an analysis component 104, both of which can be on a user device, such a mobile computing device. Alternatively or in addition, the external environment component 102 can be located on a user device and the analysis component 104 located on an external device, such as a Web service The external environment 102 is adapted to scan a local area of the mobile device (shown as dotted region) and perform a search for all base stations that are within the detectable range. Depending on the device, the base stations can be Wi-Fi (802.11) access points, cell towers, AM radio stations, FM radio stations, TV stations, or any other type of radio transmission from base station(s) 106 with known locations, including any combination of these or any base station emitting electromagnetic waves, acoustic waves, or any signal that can be detected and identified with a base station. The base stations can be mobile, such as base station(s) 108, provided the location of such base stations can be determined at a substantial similar time as when they were located. The external environment component 102 is further adapted to measure strength or other qualities of a detected signal received from each base station 106 or 108. It is to be understood that a plurality of base stations can be detected and the invention is not limited by the number of detected base stations.

Based upon the information derived from the scanned base stations, the external environment component 102 communicates or interfaces with the analysis component 104 that determines which base stations have been detected. For example, the analysis component 104 may have a database or look-up table that contains the location (longitude, latitude, elevation) of all known base stations. The analysis component 104 can compare the information received from the external environment component 102 with the known base stations and can determine or compute the location of the external environment component 102. The analysis component 104 communicates the location information to the external environment component 102 and an associated user of a mobile device.

The system 100, also referred to as a "Radio Position system" can utilize a database that includes information that can be utilized to calculate position and/or perform self-maintenance of the database. The content of the database depends on the radio system and/or the type of electronic endpoint used for location.

In one embodiment, the analysis component 104 computes the user device location, and such computation is performed on the user's device, which also maintains a database of base station coordinates $x_i$. In another embodiment, the database of base stations is maintained in a network-accessible database and the user's device communicates with this database to obtain the base station coordinates. In a further embodiment, both the location computation component and database exist in a network-accessible location. In such a manner, the user's device transmits its detected base station data over the network, and the network responds with the computed location. Maintaining the database of base station locations on a network server mitigates the necessity of the user's device using its own memory for this data and/or can access the most up-to-date version of the database. However, if the user's device will not have network access, then it should have its own local copy of the data.

If the database resides on the user's device, there are a plurality of ways the device can obtain the database information from a network while the device is connected (temporarily or permanently) to the network. According to an embodiment, the user can manually specify a subset of the database for downloading. This subset could encompass a geographic area where the user expects to be located. According to another embodiment, the system automatically computes the user's current location while the device is connected to the network and downloads a subset of the database centered on the current computed location. According to another embodiment, the user's device opportunistically connects to the network whenever it can obtain network access and downloads a subset of the database centered around the device's current location. Another embodiment is for the device to use a prediction technique to infer where the user will be located in the future and opportunistically download subsections of the database centered around predicted locations.

The system 100 is also adapted to enable a user to communicate such user's location to another user. For example, social applications (e.g., Instant Messenger) can contain a listing of "buddies" or "contacts" that have given prior permission for a user(s) to determine, obtain, or calculate their location. Included can be a proximity alert, wherein a user is notified if a "contact" is within one mile, for example, of such user. The user can determine if he wants to communicate with the "contact" and initiate such communication and/or request a meeting time/place. The system 100 can determine a place of interest, based upon known locations, where the user and "contact" can meet.

The system 100 can also provide location based services, such as asset and people tracking in real-time. Information delivery, including targeted advertising can be conducted based upon a user's current location, location history, and/or expected location in the future. The system 100 can provide real time collaboration through enhanced presence and/or location tagging of various media, important to the particular user.

Figure 2:
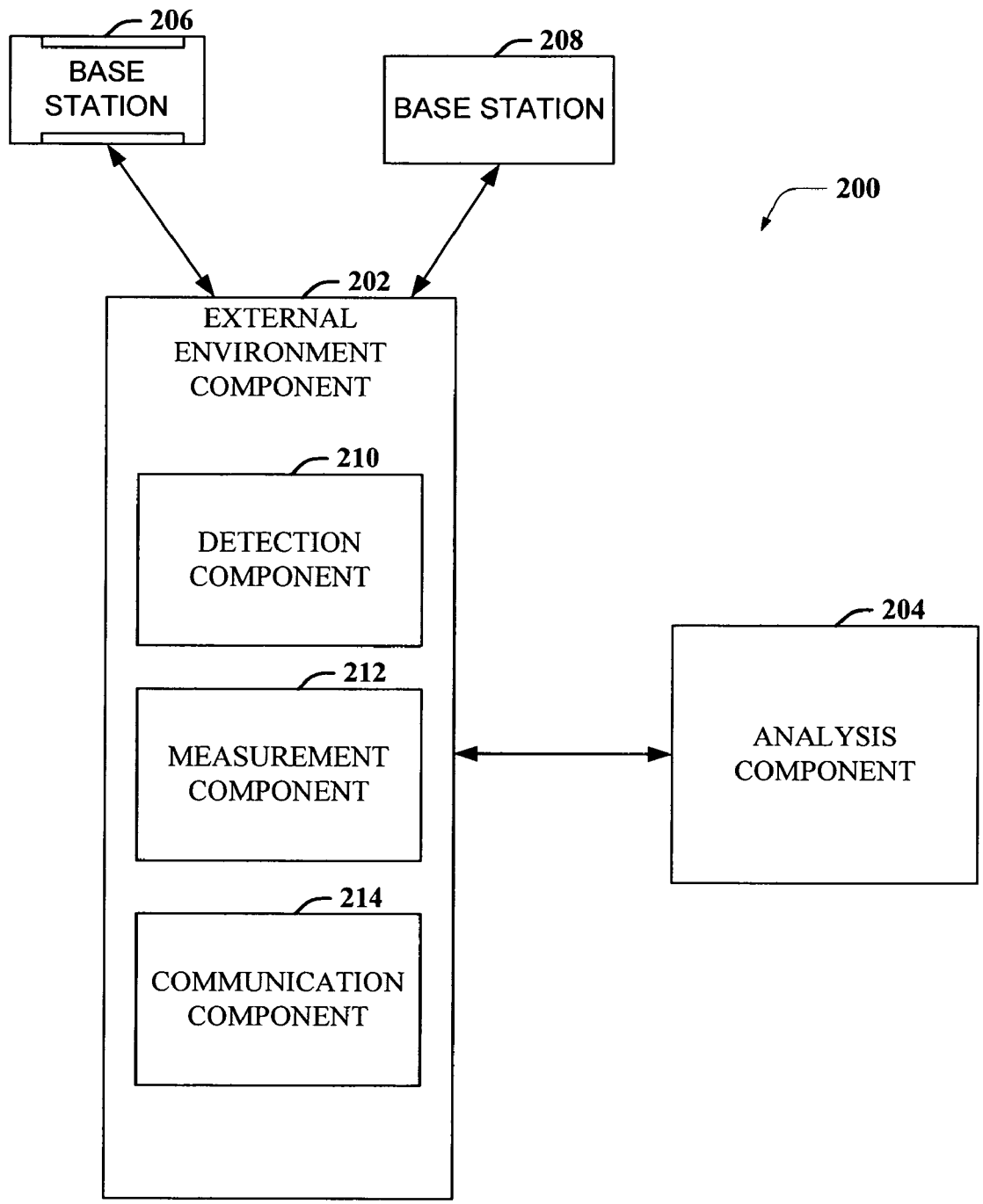
FIG. 2 illustrates a system for determining a location of a mobile computation device.

FIG. 2 illustrates a system 200 for determining a location of a mobile computation or user device. It will be understood by those having ordinary skill in the art that the components and/or modules discussed herein can be associated with a user device, a user device in combination with a remote station, and/or a user device in combination with a remote station and a centralized network.

The system 200 includes an external environment component 202 that detects or receives signals associated with one or more base stations 206 and 208. The external environment component 202 interfaces with an analysis component 204 that determines the location of the user device based at least in part on the information received from the external environment component 202. To facilitate location information the external environment component 202 can include a detection component 210, a measurement component 212, and a communication component 214.

The detection component 210 is adapted to detect base stations in the local vicinity of the user device based upon received or obtained signals. A search for or gathering of base station signals and information can be continuous, periodic, or on-demand and can be initiated by a user action, autonomously by the system 200, and/or at the request of a remote service. For example, the detection component 210 can scan the communication environment for base stations. The result of the scan can be a set of base station identifiers and can include reception characteristics. For example, a scan for Wi-Fi access points results in a MAC address for each detected access point and can include the signal strength of each detected access point. A scan for cell towers can result in receiving or obtaining cell tower identifications and the corresponding signal strength of each detected cell tower. Reception characteristics can be obtained or received in addition to, or in lieu of, signal strength. An example of an alternative reception characteristic is the base station's detection probability, computed by scanning for base stations multiple times.

The information obtained by the detection component 210 can be communicated to the measurement component 212 that can compute a reception characteristic, which can be a measure of the detection probability of the base station. This detection probability can be measured by performing repeated scans for base stations and computing the ratio of the number of times a particular base station was detected to the total number of scans. It is to be understood that reception characteristics can be signal strength and detection probability and each can be utilized as part of the location determination system but other detection probability and/or reception characteristics can be utilized instead of, or in addition to, signal strength. All such modifications are intended to be part of the subject specification and appended claims.

The information obtained from the detection component 210 and measurement component 212 are transmitted to the analysis component 204 by the communication component 214. The communication component 214 is adapted to communicate information to and receive information from the analysis component 204. The information can be transmitted to/from the communication component 216 periodically, continuously, on request, etc.

Figure 3:
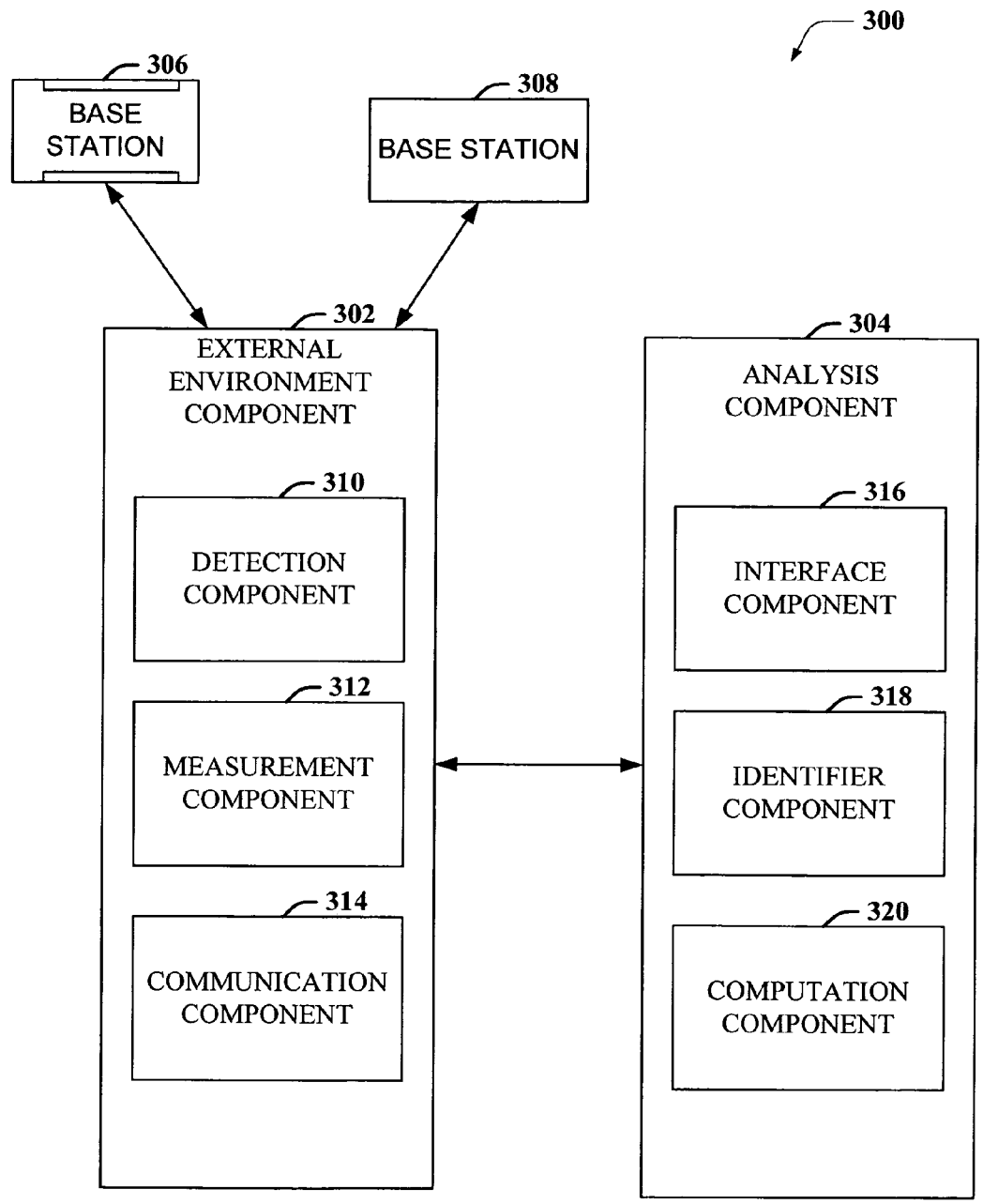
FIG. 3 illustrates a system that determines location information based upon analysis of base station signals.

Referring now to FIG. 3, illustrated is a system 300 that determines location information based upon analysis of base station signals. The system includes an external environment component 302 that interfaces with an analysis component 304. The external environment component 302 can receive or obtain signals from one or more base stations (fixed 106 and/or mobile 108). The signals are detected by a detection component 310, measured by a measurement component 312, and communicated to the analysis component 304 by a communication component 314. It is to be understood that the external environment component 302 and analysis component 304 can be on separate devices (e.g., a user device and a web service), on the same device (e.g. mobile user device).

For example, an application can call a local application program interface (API) or access a web service to obtain location information directly. Alternatively or in addition, once the location information has been computed or received, it can be abstracted into a virtual GPS like device and be utilized by location applications without the location applications having explicit knowledge of the positioning technology disclosed herein. For example, the systems and/or methods described herein can emulate a communication port and produce an NMEA compliant stream that describes the location information. Existing applications that consume NMEA position data (e.g., most applications that access GPS) will have a new source of location data to utilize.

The analysis component 304 receives the base station identifiers and reception characteristics through interaction between the communication component 314 and an interface component 316 located on the analysis component 304. It is to be understood that if the external environment component 302 and analysis component 304 are both located on a mobile user device, the communication component 314 and interface component 316 can be one component that provides a communication interface between the components of the external environment component 302 and the analysis component 304. All such modifications are considered to be part of the subject specification and appended claims.

The analysis component can further include an identifier component 318 and a computation component 320. The identifier component 318 can include a database, a look-up table, query analysis, or any means to identify a particular base station based upon the base station identifier received by the external environment component 302.

The content of the database depends on the radio system and/or the type of electronic endpoint used for location purposes. The database should contain at least the minimal amount of information necessary to determine, compute, obtain, etc. position location of a user device. For example, the database should contain beacon or electronic endpoint information that can uniquely identify a radio beacon or an electronic endpoint. Latitude, longitude, and/or elevation information should be included in the database. Position uncertainty information can be included and can be simple spherical uncertainty and/or a detailed description of position error. Position confidence information can also be included in the database. The position confidence information is a collection of data utilized to assess the relative confidence of the position information available for the beacon and/or endpoint identification. Position confidence can also, or alternatively, include information such as: last updated date, last reported data, number of reports, number of absence reports (reports that do not include this entity but includes entities to which it is closely related), and/or number of erroneous reports.

The base station data can be local (on the user device) and/or external to the device, or a combination. If the user chooses to run this service on the local user device, the device obtains at least part of the database of base station locations. An example of obtaining this information is for the user to manually specify a region over which such user expects to be or remain while utilizing the service, e.g., the greater Seattle area, King County, or Washington State.

Another example of specifying a region is to use a Web service at least once to compute the user's current location. The service can deliver a subsection of the base station database with a given radius (e.g., 10 miles, 50 miles, 100 miles) around the user's computed location. The user's device can periodically query the Web service for position updates when the network is available. In addition or alternatively, when the user moves into another region or moves close to the edges of the given radius, the user can request another computed location and/or subsection of base stations. The device can also automatically request information if a base station is detected that is not included in the subset of database information received. In such a manner, the device infers that it has moved out of the given radius and additional or alternate base station information is desired. The Web service can respond with a new subsection of the base station database to be delivered to the user's local device. In addition, the device or Web service can delete or retract the previous subset of base station information from the device when new base station information is provided, saving memory resources on the user device.

To anticipate future needs, a prediction module can predict the user's future location(s) based on past behavior. With these predictions, the user's device can automatically and/or autonomously obtain new subsections of the database covering where the user is expected to go. In such a way, a machine learning and reasoning module can be employed to infer such user action(s).

The analysis component 304 further includes a computation component 320 that utilizes the base station identifiers and reception characteristics to determine the location of the user device or receiver. A mathematical formula can be applied to the reception characteristics to triangulate the position of the user device. For example, a weighted average can be utilized to compute the user device position and can be computed based on the following equation:

$$x = \frac{\sum_{i=1}^{N} w_i x_i}{\sum_{i=1}^{N} w_i}$$

In the above equation x is a vector of the computed position coordinates. Examples of x are:

$$\begin{pmatrix} x \\ y \end{pmatrix}, \begin{pmatrix} x \\ y \\ z \end{pmatrix}, \begin{pmatrix} \text{latitude} \\ \text{longitude} \end{pmatrix}, \text{and} \begin{pmatrix} \text{latitude} \\ \text{longitude} \\ \text{altitude} \end{pmatrix}.$$

The $x_i$ coordinates are the positions of the detected base stations, whose number is N. The weights $w_i$ are calculated from the respective base station reception characteristics. For example, if the reception characteristic is signal strength, $s_i$, then the weights could be $w_i = s_i^{n'}$, where n' is an exponent chosen to maximize accuracy based on analysis, which can be theoretical or experimental analysis.

Figure 4:
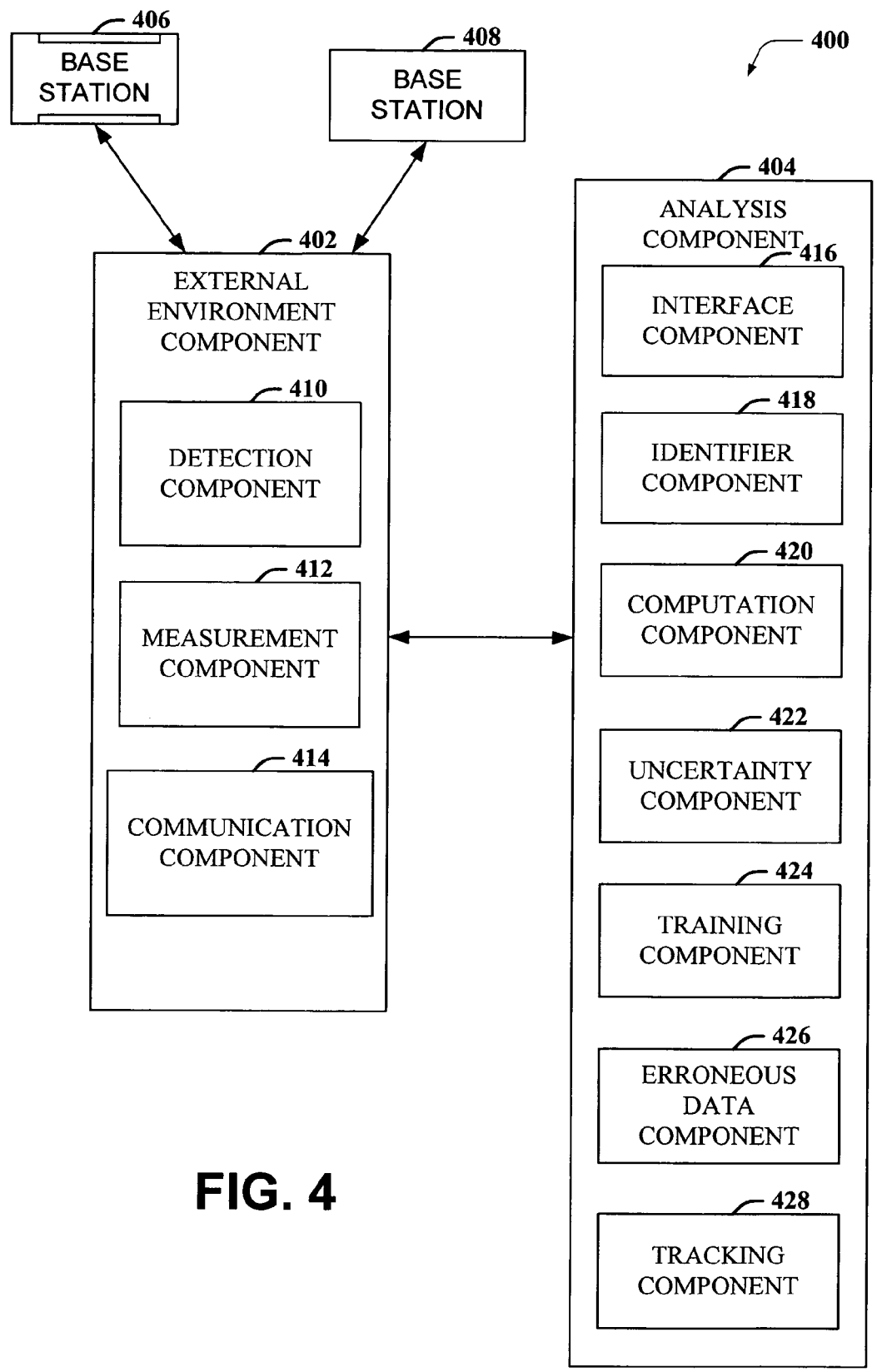
FIG. 4 illustrates a location determination system that employs components and techniques that enhance system accuracy and/or user confidence.

Referring now to FIG. 4, illustrated is a location determination system 400 that employs components and techniques that enhance system accuracy and/or user confidence. The exemplary components illustrated as associated with the system 400 are optional. In addition, the optional system 400 does not have to employ all components illustrated and one or more component can be utilized with the system 400 in any configuration. All such alterations or modifications fall within the scope of the subject specification and appended claims. The system 400 is similar to that shown and described with reference to FIGS. 1, 2, and 3.

In some situations, it is useful to supply the user associated with a mobile device with an estimate of the accuracy of the computed location. An uncertainty component 422 provides the user such an estimate. For example, if external analysis component 402 (or detection component 410) detects only one base station 406 or 408, the uncertainty component 422 can model the probability distribution of locations around that base station 406 or 408 as a Gaussian whose mean is coincident with the base station's 406 or 408 coordinates. The Guassian distribution is related to the propagation nature of the radio signal, modified by the inherent accuracy of the data point in the database. The equation for this probability function can be expressed as:

$$p(\underline{x}) = \frac{1}{(2\pi)^{n/2}|\Sigma|^{1/2}} \exp\left[-\frac{1}{2}(\underline{x}-\underline{\mu})^T \Sigma^{-1}(\underline{x}-\underline{\mu})\right]$$

In the above equation, n is the number of dimensions of the location vectors. For the two-dimensional case, n=2, and μ is set to equal $$\begin{pmatrix} x_1 \\ y_1 \end{pmatrix},$$

which is the location of the single detected base station 406 or 408. The covariance matrix Σ governs the spread of the probability in space. A reasonable setting to make the spread radially symmetric around the mean is $$\Sigma = \begin{bmatrix} \sigma^2 & 0 \\ 0 & \sigma^2 \end{bmatrix}.$$

For example, for Wi-Fi or 802.11 base stations, a reasonable value of σ is 30 meters. The corresponding root mean square (rms) error in this situation is $\sqrt{2}\sigma$, which is an easy-to-understand value to report to the user as an indication of the system's 400 accuracy.

When a plurality of base stations are detected by the external analysis component 402 (or detection component 410), the probability distribution function of location can be modeled by the uncertainty component 422 as mixture of Gaussians and can be expressed as:

$$p(\underline{x}) = \sum_{i=1}^{N} w'_i p_i(\underline{x})$$

Where N is the number of detected base stations and the w'$_i$ are normalized versions of the weights used in the triangulation formula, utilized by the computation component 420, and can be expressed as:

$$w'_i = \frac{w_i}{\sum_{j=1}^{N} w_j}$$

and p$_i$(x) is the Gaussian for base station i:

$$p_i(\underline{x}) = \frac{1}{(2\pi)^{n/2}|\Sigma_i|^{1/2}} \exp\left[-\frac{1}{2}(\underline{x}-\underline{\mu}_i)^T \Sigma_i^{-1}(\underline{x}-\underline{\mu}_i)\right]$$

where u$_i$ is the location of base station i and Σ$_i$ is the covariance matrix for base station i.

The mixture of Gaussians is a sum of probability "humps," with each hump representing one detected base station. The height of the humps is governed by the weight computed for its respective base station, when tends to place more probability mass near the higher-weighted base station(s). The mean of the mixture of Gaussians is mathematically equivalent to the triangulated location which can be expressed as:

$$\underline{\mu} = \sum_{i=1}^{N} w'_i \underline{\mu}_i$$

The covariance of the mixture of Gaussian can be computed as:

$$\Sigma = \sum_{i=1}^{N} \left( w'_i \left( \Sigma_i + \underline{\mu}_i \underline{\mu}_i^T \right) \right) - \underline{\mu}\underline{\mu}^T$$

The eigenvalues and eigenvectors of the above covariance matrix describe a space around the computed location where the actual position has a certain probability of existing. While this almost completely describes the uncertainty of the computed location, it may at times be desirable to provide a simple spherical uncertainty of rms error instead. If the n eigenvalues of the covariance matrix are $\lambda_1, \lambda_2, \ldots \lambda_n$, then the rms error, which can be a suitable accuracy value to report to the user, can be expressed as:

$$\sqrt{\sum_{i=1}^{n} \lambda_i}$$

The uncertainty of the location information, as computed by the uncertainty component 422, can be utilized to inform the user how accurate such user's location has been computed. For example, an icon on a display of the user device can change color, shape, size, etc., to provide the user a perceivable and/or quick indication of uncertainty. Alternatively or in addition, the system 400 can draw a certainty boundary on a map of the user display to indicate the size of the confidence region.

The user device can provide various types of user interfaces. For example, the user device can provide a graphical user interface (GUI), a command line interface, and the like.

For example, a GUI can be rendered that provides a user with a region or means to load, import, read, etc. the one or more uncertainty indications and/or location, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed.

The user can interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate information conveyance. However, it is to be appreciated that the embodiment(s) is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an expected or actual known user region (e.g., greater Cleveland area, Cuyahoga County, and/or Ohio State) in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Another optional component that can be associated with system 400 can be a training component 424 that can update an identifier component 418 (e.g., database, a look-up table, query analysis or any means to identify a particular base station). The base station database located and utilized by identifier component 418 at times may become outdated as new base stations are added, moved, or taken out of service. As base station detections are sent to the network database, it is possible to analyze these submissions to update the database. These updates helps to keep the identifier component 418 current without any explicit interaction or updates provided on the part of database maintainers and/or administrators.

According to one embodiment, the training component 424 analyzes sets of base station submissions. Some of the submitted base stations are known to the system 400 while others are unknown, not verified, and/or not recognized. These unknown base stations can be tagged with the location that is computed for the known base stations and added to the database. The computed locations can be inaccurate based on this information, because they are computed bases on a single sighting or detection. These formerly unknown base stations can be tagged to indicate that they are based on one, two, three, etc. sightings and may be inaccurate. As these base stations are detected or seen by other users, their locations can be updated. For example, the update can include the mean location of all the computed locations of all the sightings (detections). Once the position of these previously unknown stations has surpassed a certain, predetermined, confidence level, they can be activated in the general database and can be used for positioning analysis. In addition or alternatively to finding new base stations, analyzing incoming data can allow the database to correct and/or delete erroneous entries, and can be utilized in conjunction with the erroneous data component 426 discussed below.

The system 400 includes an erroneous data component 426 that is adapted to identify, delete, quarantine, tag, etc. base stations and/or users that are erroneous or that are providing erroneous information. The database of base station locations might contain mistaken base station locations, either by accident or by malicious intent. The triangulation algorithm, discussed above, can be "hardened" to avoid using these identified mistaken locations by tagging and/or removing erroneous entries from the database. According to an embodiment, the location of all the detected base stations returned from the database can be examined. Prior to triangulation, the largest subset of base stations that are all within a realistic range of each other can be found. This range can be computed as twice the expected detection range of a typical base station. Twice the expected detection range is utilized because a user's device should not detect two base stations separated by more than this distance. The largest subset of base stations within a mutually reasonable range should eliminate random outlier base stations.

According to another embodiment, reduction of spurious location results can be achieved by reasoning about the dynamics of a user. A user's speed is limited (based on physical limitations), therefore, computed locations that are outside a "bubble" imposed by maximum speed and elapsed time since the last computed location can be eliminated. For example, a user is not physically capable of detecting one or more base stations in South Dakota and half an hour later detecting one or more base stations in Florida. The erroneous data component 426 can determine, based on a multitude of factors, including location, speed, time, etc. the base station locations that are possible as derived from the last located, detected, seen base station.

As discussed above, base station data submitted by users in the normal course of using the system 400 can be utilized to update the database of base station location. This information can also be logged or retained for future analysis. Alternatively, or in addition, the system 400 can detect beacons that are unknown and through time and repeated correlation, determine the location and other relevant information of those beacons and add them to the database. The absence of detection of a certain beacon while nearby beacon are detected can be a signal that indicates a beacon has moved, become non-operational, etc. This data point can be flagged and can be removed from the active database, when appropriate. Either by accident or by intent, some of the submissions might contain base station identifiers that were not actually detected. The system 400 can automatically detect outliers by examining its database of base station locations. If it is determined that a particular user is submitting base stations that are flagged as outliers, or if the accuracy of the user information is below an acceptable level, the user can be flagged as being potentially malicious and all future submissions can be ignored, quarantined, flagged, or the like. For example, the user interactions can be maintained in a log or tracking component 428 that retains information associated with the sets of base stations and information relating to the user that submitted such information. This data can be utilized to improve the base station data and to detect malicious users as it can retain historical data.

It is to be understood that several parts of the systems 100-400 discussed above with reference to FIGS. 1, 2, 3, and 4 can be modularly replaced with alternate components, modules, systems, etc. For example, the triangulation computation can be replaced with a different type of triangulation computation that can be more suited to the user's task. Parts of the system that can function as "plug in" modules include the radio provider. As mentioned, the systems can work with different types of radio, e.g. Wi-Fi or 802.11, cell tower, FM, AM, TV, etc. Each type of radio is considered a different provider, which can be replaced or "plugged" into the system(s).

Another component that can be modularly replaced is the triangulation associated with the computation component. Other types of triangulation might be more suitable for a user's task, in terms of accuracy, computation speed, ability to obtain different kinds of radio as an input, etc.

Alternatively or in addition, depending on the situation, other types of uncertainty estimates can be suitable. For instance, some uncertainty components can take into account the speed, acceleration, direction, etc. of the user. Thus, if the user is moving at a certain speed in a known direction, the uncertainty component can factor such analysis into its computation.

Figure 5:
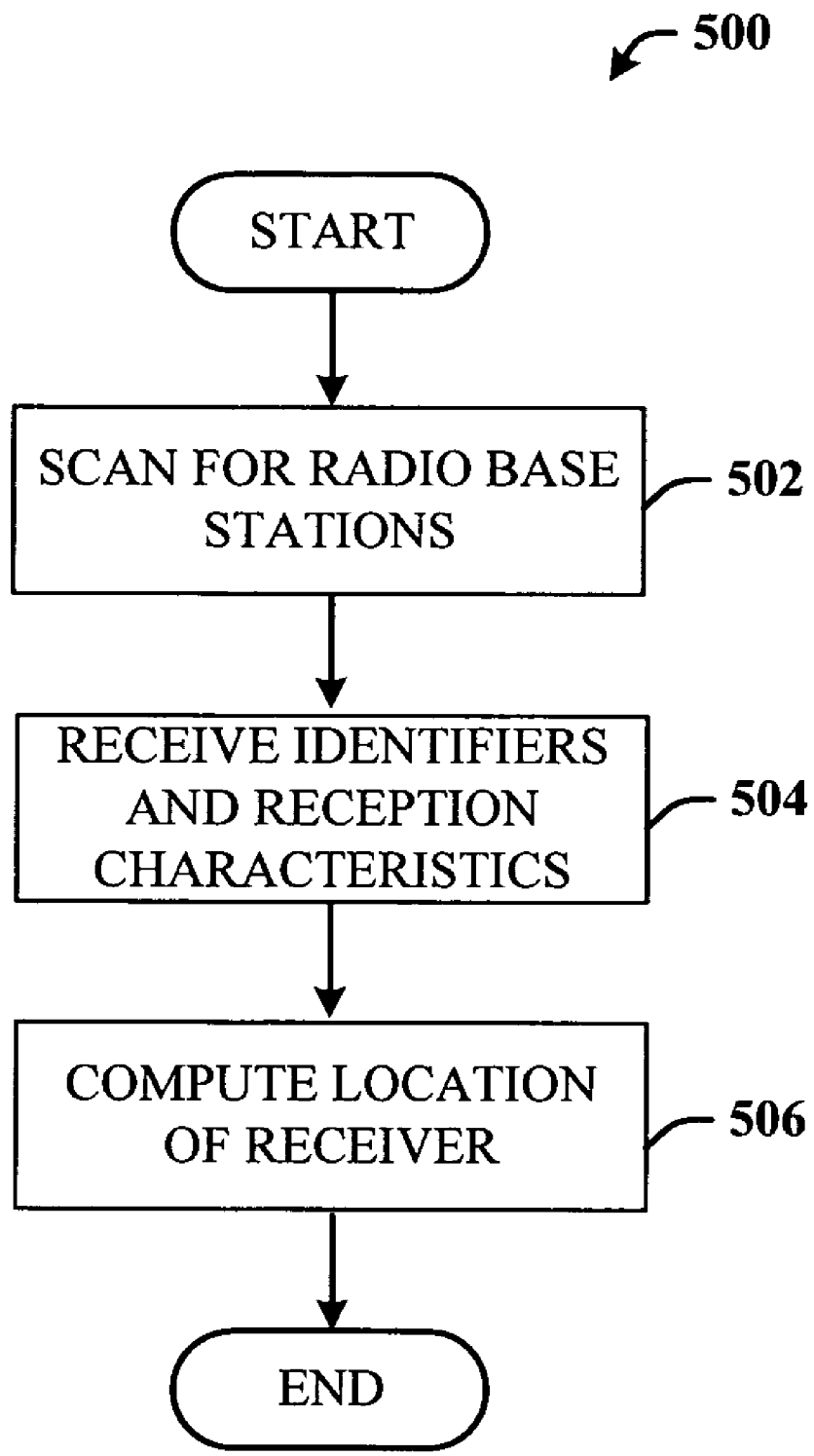
FIG. 5 illustrates a flow chart of a methodology for determining the location of a mobile device

With reference now to FIG. 5, illustrated is a flow chart of a methodology 500 for determining position location of a mobile device. While, for purposes of simplicity of explanation, the methodologies described herein are shown and described as a series of acts, it is to be understood and appreciated that the methodologies are not limited by the order of acts, as some acts may, in accordance with these methodologies, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement the following methodologies.

The method 500 starts, at 502, where a search for radio base stations is performed or conducted. The radio base stations can be Wi-Fi (802.11) access points, cell towers, AM radio stations, FM radio stations, TV stations, or any other type of radio transmission from base stations. The base stations could have known locations and can be mobile, provided there is a mechanism in place to identify the location of the base station when it is detected.

The method continues, at 504, where identifiers and reception characteristics of the base station(s) is received. For example, a scan for Wi-Fi access points can result in a MAC address and signal strength for each detected access point. A scan for cell towers can result in cell tower identifications and corresponding signal strengths. The receptions characteristics can include signal strength, a measure of the detection probability of the base station, etc. The detection probability can be measured by conducting repeated (continuous or periodic) scans for base station and computing the ratio of the number of times a particular base station is detected to the total number of scans.

The base station identifiers and reception characteristics can be utilized, at 506, to compute the location of the receiver or user device. For example, triangulation, or similar algorithm, can be utilized to compute the user's location based on the detected base stations and their signal strengths. Also included can be techniques to compute the uncertainty of the position estimate.

An exemplary method of computing uncertainty is based on a sum of probability functions. Each detected base station can give rise to a 2D probability "hump" in (latitude, longitude) space. Summing up these humps gives an overall probability distribution, which can be summarized as a mean (latitude, longitude) and/or a confidence region around the mean. The size of the confidence region is the reported uncertainty. This method can be extended to provide 3D positioning uncertainty by including the elevation dimension in the calculations.

Another exemplary method to compute uncertainty can be based upon experimental data. For example, a table can be made that gives the actual measured accuracy of the disclosed technique(s) as a function of how many radio base stations were detected. When a user detects a certain number of base stations, the expected accuracy can be looked up on the table. A different table can give the actual measured accuracy as a function of which base stations have actually been detected, which could be reported as the uncertainty.

As users utilize the service, the base station data they send can be recorded to update and grow the base station database. Some users, equipped with GPS receivers, for example, can send latitude, longitude, and/or elevation data with their base station data. This information can be utilized directly to update the database of base station locations. The same users or other users can send in a list of detected base stations, some of which may be included in the database and some of which can be previously unknown, unidentified, or not included in the database. The service can compute the user's location using the base stations with which it is aware. Then, the service can attach this computed location to the unknown base stations and add them to the database. These base station(s) can be added immediately with or without flags to indicate they are unconfirmed, and/or can be added only after a confidence level is achieved through detection by a plurality of users. The accuracy of computed locations can be maintained in spite of mistakes in the database (known as antispoofing). Additionally or in addition, certain users can be flagged if it is determined that they may be submitting false information.

The location information obtained from the disclosed systems 100-400 can be delivered to applications in a plurality of ways, a few of which will be discussed below. It is to be understood that the below exemplary description of delivery systems and/or methods are discussed for illustration purposes and that other means of delivery can be utilized and fall within the scope of the detailed description and appended claims.

The location information determined by the systems and/or methodologies disclosed herein can be delivered via a web service that frees the obligation of the consumer platform to have complex software and/or extensive databases. The application, using the disclosed positioning service(s) can collect radio signal information or other suitable information to the electronic endpoint being analyzed. This information can be sent to a web service, which will resolve the information into a position and provide requested information to the system and/or user.

An exemplary implementation is a SOAP/XML API (simple object access protocol/extensible markup language application program interface), where the key method can be a GetPosition. A GetPosition can take in, obtain, or determine parameters including Beacon or Electronic Endpoint Type and/or Beacon or Electronic Endpoint Data Array. Members of the array structure can change depending on the type of beacon or endpoint used. In general, the members can include an identifier and/or quality, which is a component that can describe the quality of the signal. Examples of a quality component can include signal strength and/or detection frequency.

This method can return a position object, which includes a set of suggested and optional data fields that describe a position. The position object can have at least the following suggested fields: Latitude, Longitude, TimeOfFix, and/or Coordinate reference system. It can also have at least the following optional fields: Elevation, Uncertainty description and magnitude (this can be simple spherical error, rms error, and/or other more extensive uncertainty description(s)).

Figure 6:
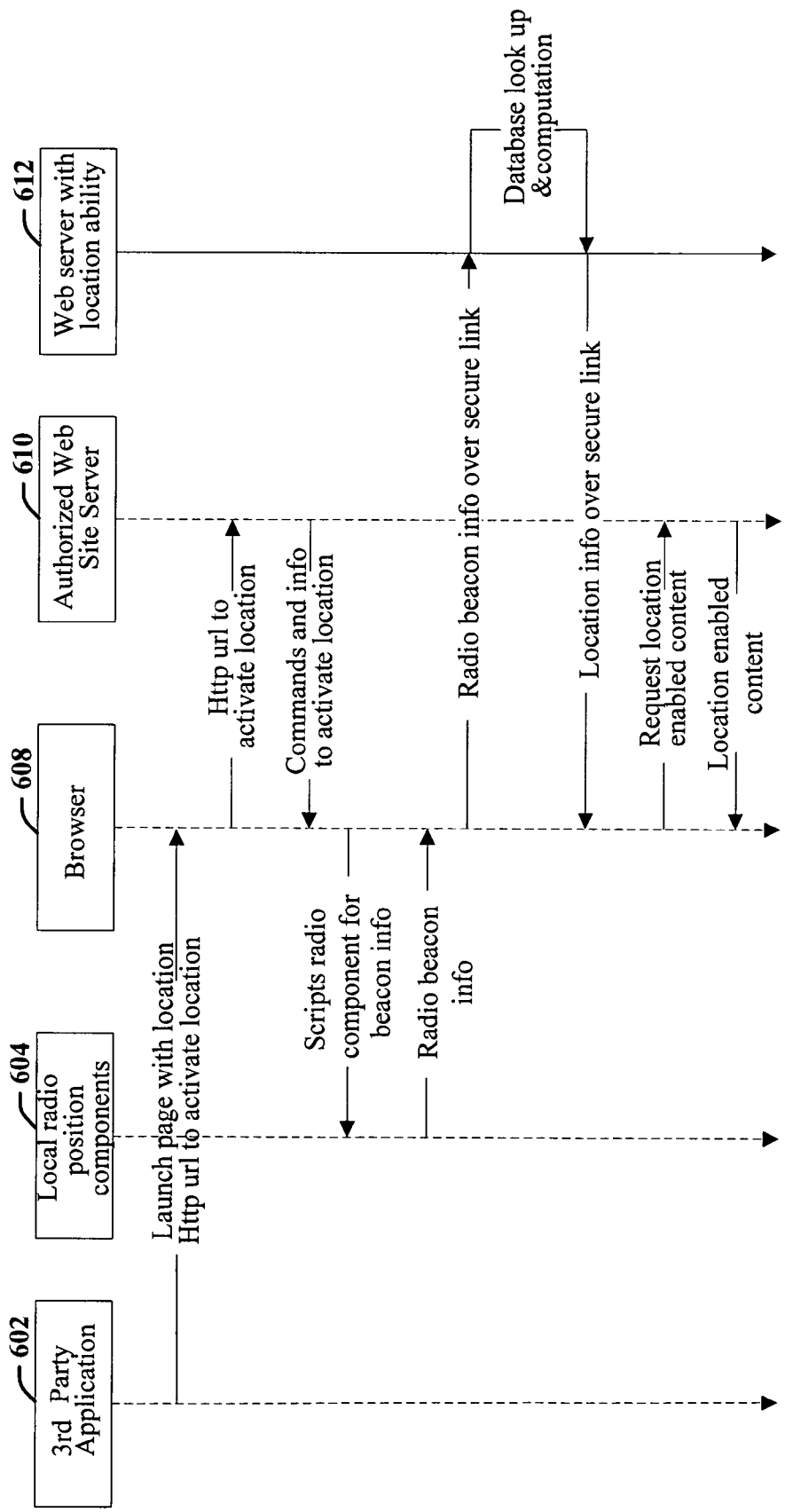
FIG. 6 illustrates an exemplary system and message flow diagram for an application or browser utilizing location information using https handlers and/or web service.

FIG. 6 illustrates an exemplary system and message flow diagram for an application or browser utilizing location information using https handlers and/or web service. The system 600 includes a third party application 602, local radio position component 604, browser 606, an authorized web site server 608, and a web server with location ability. Such a system enables a browser to interact easily with the server to obtain the user's location and deliver location-enhanced content. A browser, or other software, can collect radio (or other electronic endpoint) information (identification and/or quality) and format the data in a URL (uniform/universal resource locator) to be sent to the http/https handler. An example can be https://locateme.com?RadioType=802.11&RadioID1=xxy&Quality 1=0.2&RadioID2=xx2&Quality2=0.4 or https://locateme.com?RadioInfo=true with the actual data in a body of the request. The http/https handler can then reply with the appropriate location information such that the browser or software can take advantage of the location information.

Figure 7:
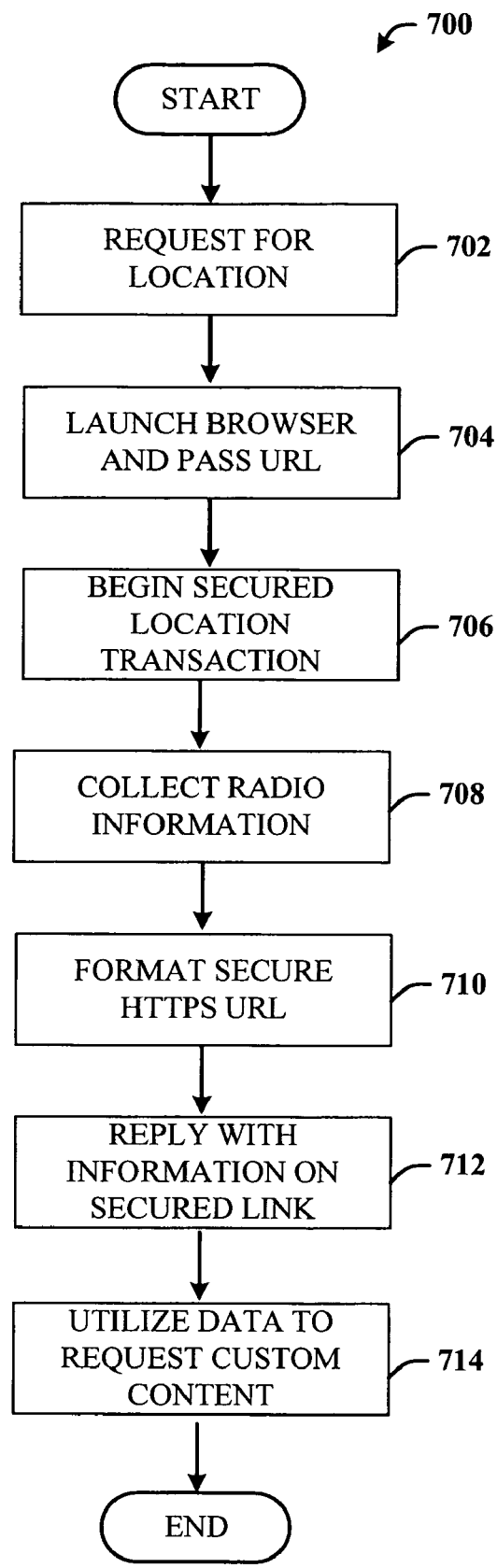
FIG. 7 illustrates a flow chart of a methodology for an application or browser utilizing location information using https handlers and/or web service.

With reference now to FIGS. 6 and 7, the following describes an implementation that allows a browser to deliver location specific information to a user while preventing unauthorized parties from discovering the user's exact location. It also allows a third party application to launch the browser, showing the user's location in a secure manner.

A request for location is initiated by a third party application, at 702. The third party application launches the browser and pass a URL, at 704, indicating that a location is requested. An example of such URL can be: http://locateme?locateme=true. At 706, a locateme.com server, for example, can recognize this URL and send the browser a command to begin a secured location transaction. The browser and/or software can collect radio information from the local device, at 708.

The method 700 continues, at 710, where a secure https url is formatted with the required radio information and sent to a web server with an https handler. For example, the URL can be in the following format: https://locateme.com?RadioType=802.11&RadioID1=xxy& Quality1=0.2 or https://locateme.com?RadioInfo=true with more data located in the body. At 712, the server can reply with the request location information on the secured link. The browser, at 714, can utilize this data to request custom content. Such a request and the following request may or may not be on a secured link, depending on the communication protocol and/or preferences.

Figure 8:
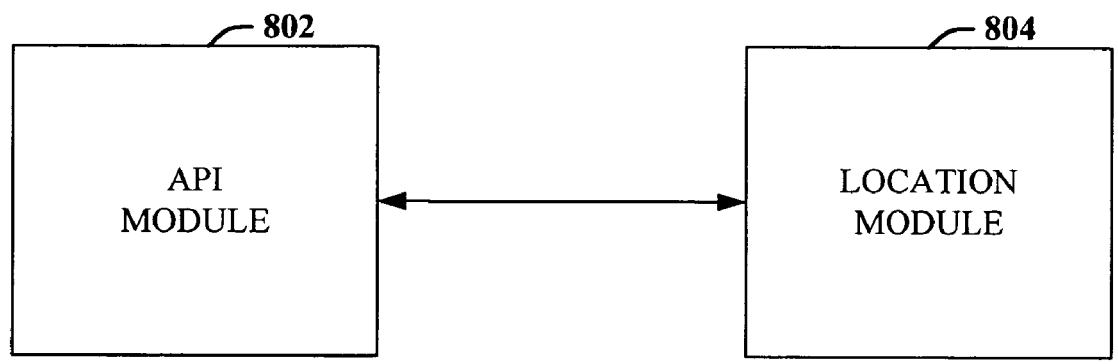
FIG. 8 illustrates a system that accesses location information via an API on a user device.

FIG. 8, illustrates a system 800 that accesses location information via an API on a local machine or user device. An API module 802 can interface with a location module 804, which serves as a proxy to obtain location information for a variety of sources. Such location information can include radio position and/or other usable electronic endpoints. If multiple position sources are available, the most appropriate one will be chosen based on the requirements of the calling software and the quality of the obtained location. The location proxy module 804 can also utilize a web service to obtain location information.

The API module 802 can obtain the location information utilizing a variety of technologies (e.g., COM). The purpose is to allow applications to query for location in a flexible way. For example, the GetPosition method can return a Position object, similar to the Position module discussed above. The local GetPosition method can take a variety of optional parameters. A few exemplary optional parameters will be discussed below.

Provider is a parameter that can specify one or more location technologies to utilize (e.g., WiFi, radio, GPS, . . . ). The relative preference of various location technology can also be specified. If this optional filed is not present, then the location proxy module 804 can choose the most appropriate service currently available based on other input parameters and/or the quality of available locations.

Other exemplary parameters include accuracy, age, and/or response time. If set for accuracy, the location proxy module 804 can attempt to satisfy the input accuracy level. Age refers to the maximum age of the acquired location wherein the location proxy module 804 may cache previous requests to improve performance. Response time, if set, will enable the location proxy module 804 to choose the appropriate method in an attempt to satisfy a desired response time.

The system(s) and/or method(s) disclosed herein can utilize a simulated NMEA navigation device. The location information obtained from radio positioning can be delivered to an application via an NMEA stream over a communication port. This allows any application designed to take advantage of traditional GPS system to utilize radio positioning as disclosed herein. The obtained positions can be formatted into a string compatible with NMEA standards and streamed into an emulated communication port. Since not all fields of the NMEA sentences may be available with radio positioning, some will be left blank or filled with placeholder values. Other fields, such as horizontal and/or vertical dilution of precision, can be simulated by a computed value, for example, an uncertainty factor.

Figure 9:
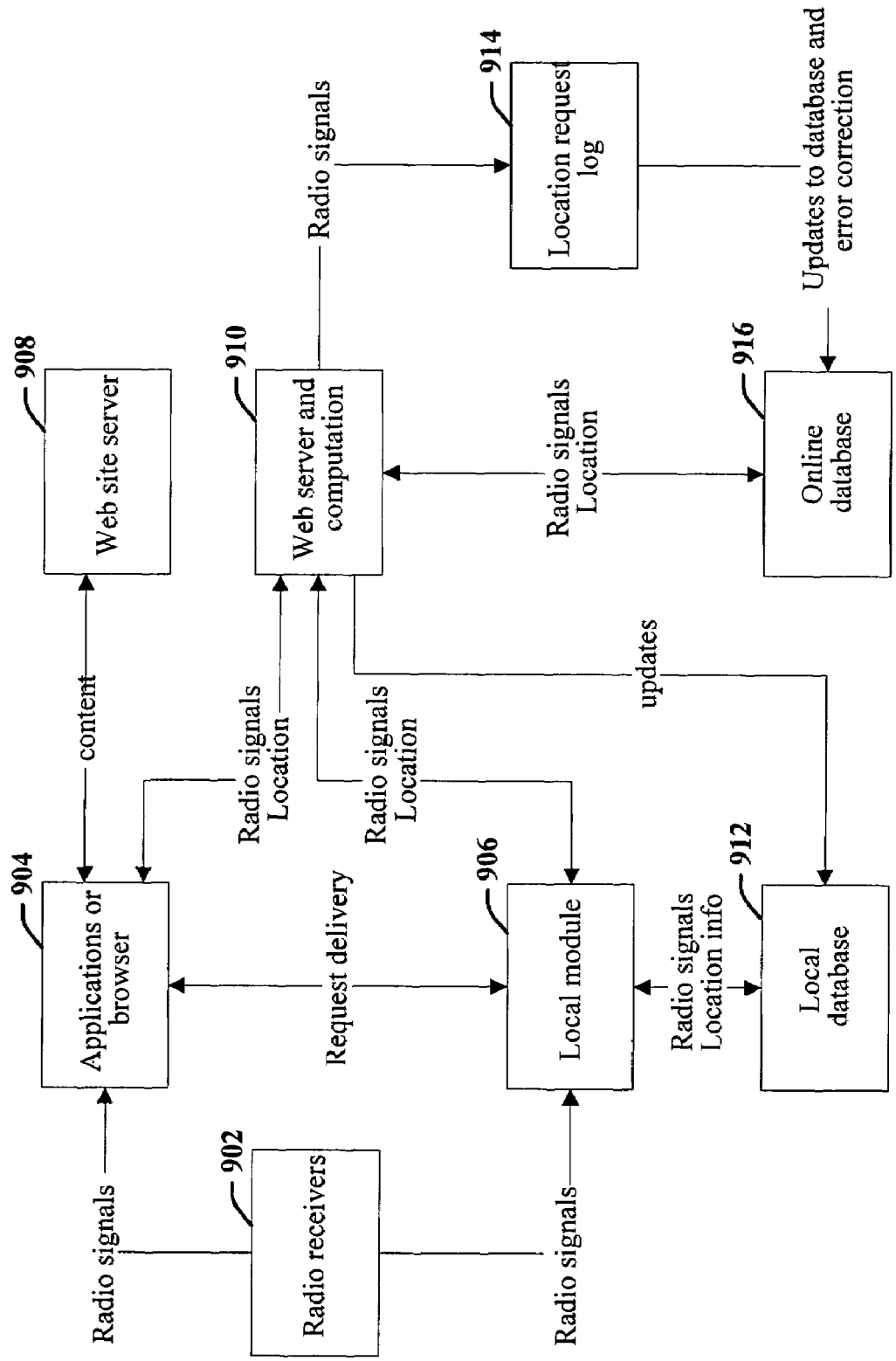
FIG. 9 illustrates a high-level diagram that utilizes the system(s) and/or method(s) disclosed herein.

With reference now to FIG. 9, illustrated is a high level diagram 900 that utilizes the system(s) and/or method(s) disclosed herein. One or more radio receiver 902 is adapted to transmit radio signals. These radio signals are received by application(s) or browser 904 and/or a local module 906. The application(s) or browser 904 and the local module 906 interact to request delivery information. The application(s) or browser 904 is further adapted to interface with a web site server 908, such as sending and/or receiving content information, and/or a web server and computation component 910. The web server and computation component is further adapted to interface with the local module 906 and provides update information to a local database 912 that interfaces with the local module 906. The web server and computation module 910 transmits radio signals to a location request log 914. Updates to database and error connection data is transmitted from the location request log 914 to an online database that interfaces with the web server 916 and computation module 910.

The system 900 can provide a user with local search information. For example, the user, through interaction with a user device, such as with tool bar integration, can request a web search and, based at least in part on the user's computed location, information regarding various parameters of the web search can be returned to the user. The system can also provide on-line mapping and can include such features as current location tracking, finding places of interest around the user's computed location, and/or route planning, based on user input or inferred user action.

The system(s) and/or method(s) disclosed herein can also provide a user's location history. This history can include travel information, such as the user's location at various times. A blog and/or journal can be updated with this information. In another embodiment, marketing research can be performed based on the user's current location, location history, and/or future location. It is to be understood that the marketing and/or marketing research would be enabled by a previous authorization from the user.

The system can be adapted to enable a user to communicate such user's location to another user. For example, social applications (e.g., Instant Messenger) can contain a listing of "buddies" or "contacts" that have given prior permission for a user(s) to determine, obtain, calculate their location. Included can be a proximity alert, wherein a user is notified if a "contact" is within one mile, for example, of such user. The user can determine if he wants to communicate with the "contact" and initiate such communication and/or request a meeting time/place. The system can determine a place of interest, based upon known locations, where the user and "contact" can meet.

The system can also provide location based services, such as asset and people tracking in real-time. Information delivery, including targeted advertising can be conducted based upon a user's current location, location history, and/or expected location in the future. The system can provide real time collaboration through enhanced presence and/or location tagging of various media, important to the particular user.

Figure 10:
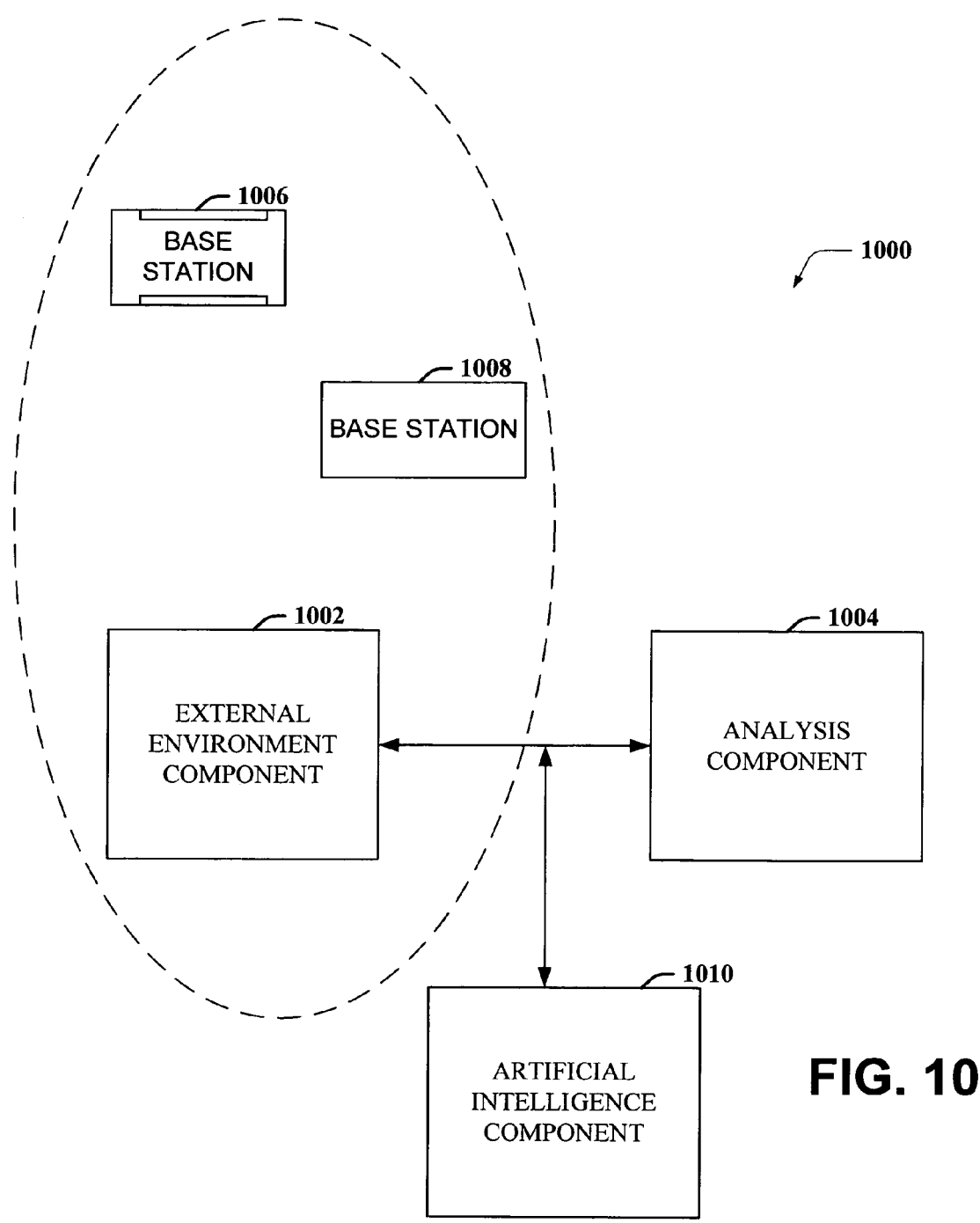
FIG. 10 illustrates a system for determining location that utilizes artificial intelligence.

FIG. 10 illustrates a system for determining location information that utilizes artificial intelligence (AI), which facilitates automating one or more features in accordance with the subject specification. The AI can be effected via AI component 1010 as illustrated. The disclosed system(s) and/or method(s) (e.g., in connection with determination location of a user device) can employ various AI-based schemes for carrying out various aspects thereof. For example, a process for determining the location of a user device can be facilitated via an automatic classifier system and process. A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of mobile systems, for example, attributes can be latitude, longitude or other data-specific attributes derived from at least one base station (e.g., Wi-Fi, AM, FM, . . . ), and the classes are reception characteristics or signal strengths.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the system(s) and/or method(s) can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to grant access, which stored procedure to execute, etc. The criteria can include, but is not limited to, the amount of data or resources to access via a call, the type of data, the importance of the data, etc.

Figure 11:
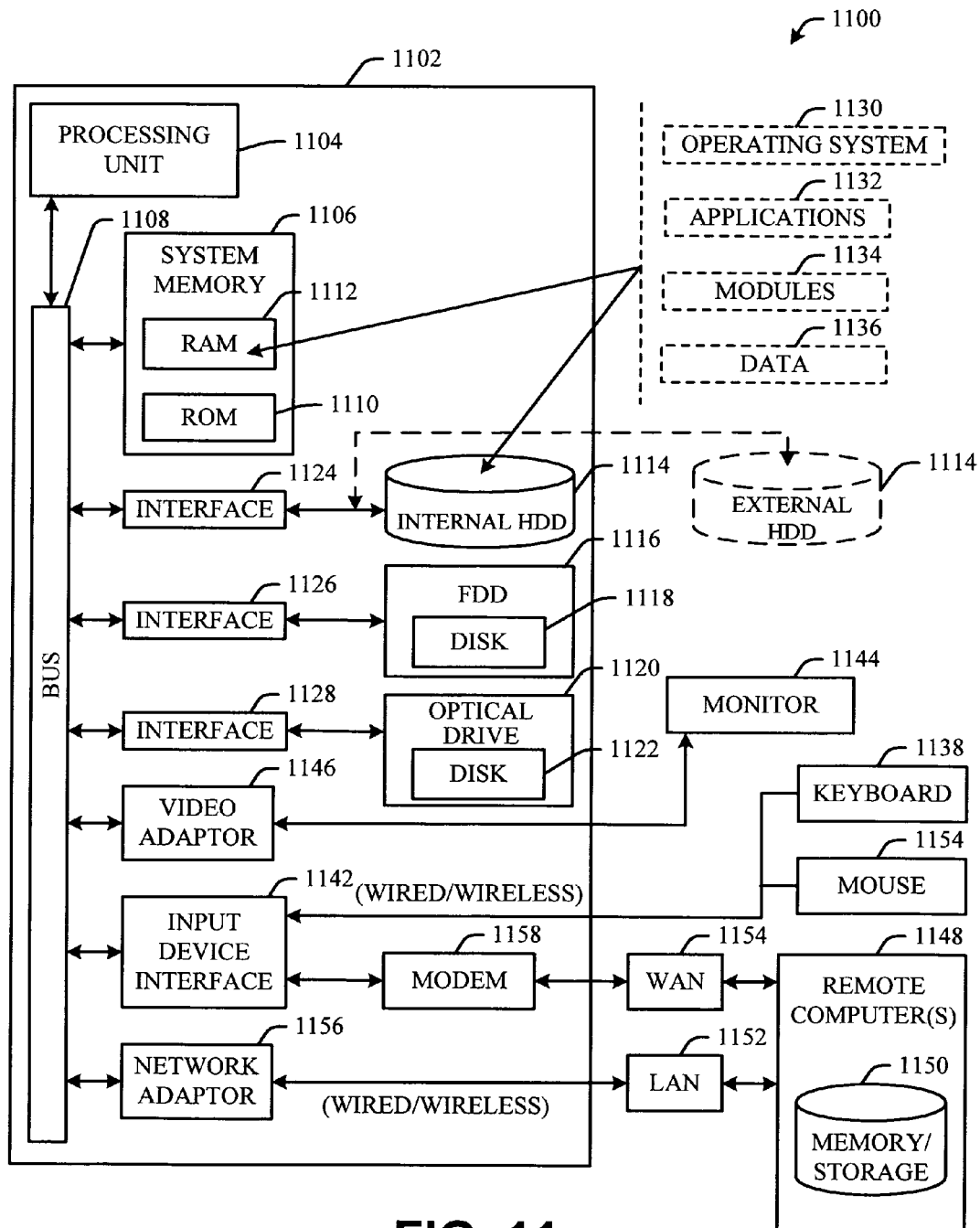
FIG. 11 illustrates a block diagram of a computer operable to execute the disclosed embodiments.

Referring now to FIG. 11, there is illustrated a block diagram of a computer operable to execute the disclosed architecture. In order to provide additional context for various aspects disclosed herein, FIG. 11 and the following discussion are intended to provide a brief, general description of a suitable computing environment 1100 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the various embodiments can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b)

data rate, for example, or with products that contain both bands (dual band), so the networks can provide real-world performance similar to the basic 10BaseT wired Ethernet networks used in many offices.

Figure 12:
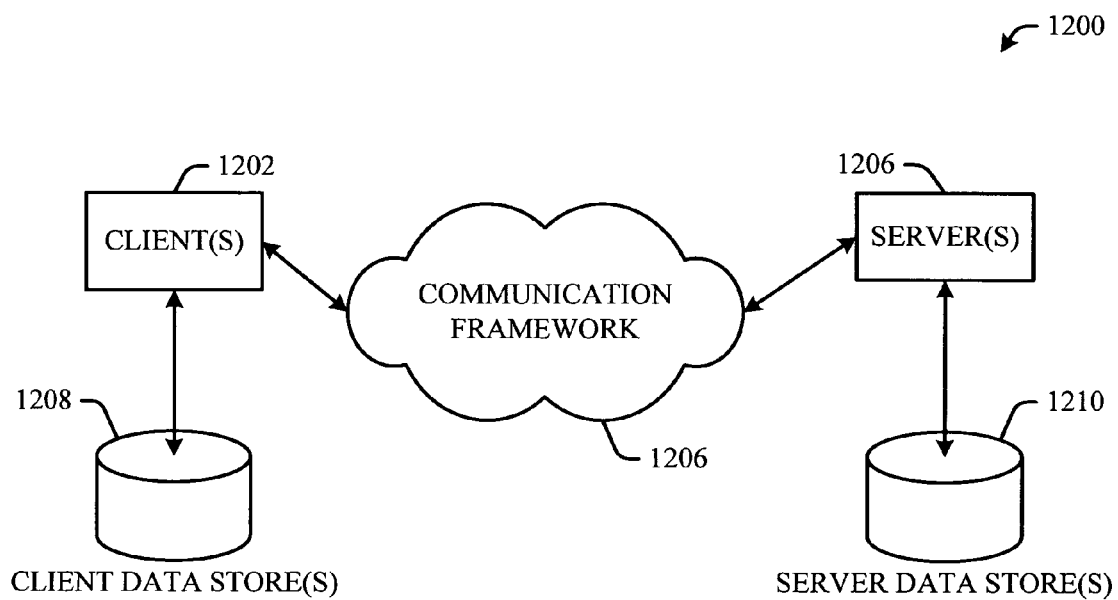
FIG. 12 illustrates a schematic block diagram of an exemplary computing environment operable to execute the disclosed embodiments.

Referring now to FIG. 12, there is illustrated a schematic block diagram of an exemplary computing environment 1200 in accordance with the various embodiments. The system 1200 includes one or more client(s) 1202. The client(s) 1202 can be hardware and/or software (e.g., threads, processes, computing devices). The client(s) 1202 can house cookie(s) and/or associated contextual information by employing the various embodiments, for example.

The system 1200 also includes one or more server(s) 1204. The server(s) 1204 can also be hardware and/or software (e.g., threads, processes, computing devices). The servers 1204 can house threads to perform transformations by employing the various embodiments, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates position location, comprising:
an external environment component that detects at least one base station in a vicinity of a user device, communicates a base station information to a World Wide Web service and receives a database of base station locations from the Web service, the base station locations are proximate the at least one base station;
an analysis component that employs the database of base station locations and determines a location of the user device based at least in part on the database of base station locations;
an erroneous data component that tracks base station information received from the user device and flags the user device if false data is received; and
a proximity component configured to:
use the determined location of the user device for determining whether another device is located within a predetermined distance from the user device; and
if it is determined that the devices are located within the predetermined distance from one another, initiate a communication with a user of the another device and request a meeting with the user via the communication.

2. The system of claim 1, the analysis component comprising: an uncertainty component that determines an uncertainty of the user device location information.

3. The system of claim 2, the uncertainty of the user device is a sum of a probability function.

4. The system of claim 2, the uncertainty of the user device is based on experimental data.

5. The system of claim 1, further comprising:
a training component that automatically updates the database of base station locations with at least one of a new base station location, an indication that a base station has moved, or an indication that a base station has been taken out of service if the base station information received from the external analysis component is not included in the database.

6. The system of claim 1, the at least one base station emits a signal that can be characterized by the user device.

7. The system of claim 1, the at least one base station emits one of a Wi-Fi, AM, FM, TV, an electromagnetic and an acoustic signal.

8. A system that determines location of a mobile device, comprising:
means for receiving base station identification information and reception characteristics from a plurality of base stations;
means for communicating the base station identification information to a Web service;
means for receiving a first subset of a database of base station locations, the base station locations are in a vicinity of the base stations;
means for verifying accuracy of a location of the base stations based at least in part on the first subset of base station locations;
means for computing location of the mobile device based at least in part on the determined location of the base stations;
means for automatically requesting a second subset of the database of base station locations from the Web service if a base station is detected that is not included in the first subset of the database of base station locations received from the Web service;
means for predicting a future location of the mobile device based on past behavior;

means for using the computed location of the mobile device for determining whether another device is located within a predetermined distance from the mobile device;

means for initiating a communication with a user of the another device and requesting a meeting with the user via the communication if it is determined that the devices are located within the predetermined distance from one another;

means for determining an uncertainty of the computed location of the mobile device based on one of a number of the plurality of base stations and the base station identification information; and means for calculating an accuracy level of the computed location of the mobile device based at least in part on the determined uncertainty.

9. The system of claim 8, further comprising means for calculating an error percentage of the calculated mobile device location.

10. The system of claim 8, further comprising:

means for updating the database of base station locations at the Web service;

means for determining an accuracy of the updated base station locations; and means for prohibiting transmission of the updated base station locations if the accuracy is below an acceptable level.

11. A system that determines location of a mobile device, comprising:

an external environment component that detects at least one base station in a vicinity of a mobile device and obtains a signal characteristic of the at least one base station;

a measurement component that determines a value of the signal characteristic;

a communication component that transmits base station information to a World Wide Web service and receives a first subset of a database of base station locations from the Web service, the base station locations are proximate the at least one base station;

an analysis component that employs the database of base station locations and determines a location of the mobile device based at least in part on the base station information and the database of base station locations, wherein the analysis component automatically requests a second subset of the database of base station locations from the Web service if a base station is detected that is not included in the first subset of the database of base station locations received from the Web service, and wherein the device or Web service is configurable to delete the first subset of the database of base station locations from the device when the second subset of the database of base station locations is provided; and an uncertainty component that refines the location of the mobile device based on an uncertainty factor determined at least in part from the value of the signal characteristic;

an erroneous data component that tracks base station information received from the mobile device and flags the mobile device if false data is received; and a proximity component configured to:

use the determined location of the mobile device for determining whether another device is located within a predetermined distance from the mobile device; and if it is determined that the devices are located within the predetermined distance from one another, initiate a communication with a user of the another device and request a meeting with the user via the communication.

12. The system of claim 11, further comprising a training component that automatically updates the Web service with at least one new base station location if the new base station location is not included in the subset of the database of base station locations.

13. A method for determining a location of a mobile device, comprising:

receiving base station identification information and reception characteristics from a plurality of base stations;

communicating the base station identification information to a Web service;

receiving a first subset of a database of base station locations, the base station locations are in a vicinity of the base stations;

verifying accuracy of a location of the base stations based at least in part on the first subset of base station locations;

computing location of the mobile device based at least in part on the determined location of the base stations;

automatically requesting a second subset of the database of base station locations from the Web service if a base station is detected that is not included in the first subset of the database of base station locations received from the Web service;

predicting a future location of the mobile device based on past behavior;

using the computed location of the mobile device for determining whether another device is located within a predetermined distance from the mobile device;

initiating a communication with a user of the another device and requesting a meeting with the user via the communication if it is determined that the devices are located within the predetermined distance from one another;

determining an uncertainty of the computed location of the mobile device based on one of a number of the plurality of base stations and the base station identification information; and calculating an accuracy level of the computed location of the mobile device based at least in part on the determined uncertainty.

* * * * *